UNITED STATES PATENT OFFICE.

ALEXANDER S. RAMAGE, OF BUFFALO, NEW YORK, ASSIGNOR TO THE CHEMICAL DEVELOPMENT CO., OF BUFFALO, NEW YORK, A CORPORATION OF COLORADO.

LEAD PIGMENT AND METHOD OF MAKING.

991,088.      Specification of Letters Patent.      Patented May 2, 1911.

No Drawing. Original application filed January 3, 1910, Serial No. 535,998. Divided and this application filed August 22, 1910. Serial No. 578,468.

*To all whom it may concern:*

Be it known that I, ALEXANDER S. RAMAGE, a citizen of the United States, residing at Buffalo, in the county of Erie and State of New York, have invented certain new and useful Improvements in Lead Pigments and Method of Making Same, of which the following is a specification.

This invention relates to the preparation of certain novel pigments containing as essential components certain soaps of organic acids. The acids preferably employed are the higher fatty acids, the composition of which accords with the general formula $C_nH_{2n}O_2$.

It is well understood that the rapid disintegration of paint films containing white lead is due largely to the formation of lead soaps by the union of the basic constituents of the pigment with the unsaturated acids of the linseed or other oils comprising the vehicle. These soaps act as carriers of oxygen, and even in the absence of artificial driers, will bring about the oxidation and ultimate disintegration of the film, with the result that the dried paint after a certain time of exposure to the elements becomes chalky and no longer affords an efficient protection against moisture.

I have found that if the basic constituents of lead compounds having a basic character, as for example red lead, or the basic carbonate, chromate or sulfate of lead, be first neutralized by a saturated organic acid, the resulting product, containing a lead soap of such acid, constitutes a pigment which is readily miscible with linseed or other paint oils or vehicles, suspends readily therein, works and spreads smoothly under the brush, and dries rapidly with a high gloss which is not lost even by long exposure to the elements. For example, it is well known that red lead is incapable of any prolonged suspension in linseed oil, but settles quickly into a hard mass; for this reason it is always freshly mixed with oil immediately before application, and in spite of the necessarily crude character of the mixture the resulting paint is regarded as among the most efficient known for coating structural iron. By proceeding as hereafter described however I am enabled to prepare pigments from red lead which not only possess all of its valuable properties, but are also capable of prolonged suspension in oil and do not settle therefrom in the compact mass which is characteristic of red lead paints as heretofore prepared. My paint possesses furthermore marked advantages as regards working and spreading power, closely resembling in this respect the best chrome pigments. It is furthermore characteristic of these pigments that they can be mixed with ordinary rosin varnish, which is quite inapplicable as a vehicle for lead pigments as heretofore prepared.

These pigments may be prepared by various methods, the following procedure being preferred. Stearic acid, its glycerides, or such mixed glycerides containing stearic acid, as the tallows, is first saponified in the usual manner by boiling with aqueous solutions of alkalis, and the resulting soaps in aqueous solution are decomposed by the addition of red lead or other basic pigment. The reaction may be hastened by heating, though excessive temperatures should be avoided; a temperature of 180° F., has been found suitable for white lead; and temperatures of 130–140° F., for red lead. The saturated fatty acid combines with a part of the lead with formation of a soap which exists either in chemical combination or in such close association with the residual lead oxid as profoundly to modify its character. The product, collected by filtration, washed free from alkali and dried, is a friable mass possessing an even higher brilliance than the ordinary red lead and comparable with the best orange mineral. It differs radically from red lead however in having the capability before referred to of mixing directly with paint oils, as raw linseed oil, or with rosin varnish, to form true paints which may be preserved without settling into a hard or caked mass. For preparation of a paint, the dry pigment is preferably ground directly in raw linseed or refined fish oil, forming a paste which shows no tendency to harden. For preparation of the paint from red lead, this paste is simply thinned with oil, using about twelve pounds to the gallon of oil. The pigment containing the lead soap may be otherwise prepared, as for example by heating the red lead with the melted soap or with the melted stearic acid in a steam-heated kettle. The saturated fatty acid is preferably used in proportion sufficient to combine with the saponifiable portion of the red lead or other lead pigment, that is to say with the PbO constituent of the red lead or with the Pb(OH)$_2$ constituent of the basic lead salt; the invention is not however restricted to this particular proportion.

The process is applicable directly to the preparation of pigments from the basic carbonate of lead or white lead, the hydroxyl constituent being in this case replaced, preferably in substantial entirety, by the saturated organic acid. In case tallow is used for the preparation of the white pigment it should be bleached by any of the usual methods, in which case the pigment is pure white in color. The paint prepared by grinding this pigment in oils is superior in working qualities to the best white lead, and is far superior to this in gloss and permanence, owing to the absence of soaps of unsaturated acids capable of acting as carriers of oxygen.

For the preparation of a pigment from white lead basic chromes and similar basic salts of lead, I may agitate the pigment with a suitable soap solution at a moderate temperature, 180° F. being sufficient. When the combination is substantially complete the temperature may be reduced to about 120° F. by the addition of cold water, and a suitable quantity of a soluble salt of lead, as lead acetate, added. The purpose of this addition is to precipitate any undecomposed soap and thereby to facilitate the filtration. The modified pigment is then filtered, thoroughly washed with pure water, and will be found to dry to a friable mass which is readily mixed with oil.

The process is similarly applicable to the preparation of pigments from the basic chromates or sulfates of lead, and in general from such salts or compounds as contain lead monoxid or hydroxid or are capable of uniting with the fatty acids. Less satisfactory results as regards permanence of the paint film are obtained by using instead of the fully saturated acids of the series $C_nH_{2n}O_2$, of which stearic and palmitic acids are types, such partially saturated acids as oleic acid, having the general formula $C_nH_{2n-2}O_2$; but, as above pointed out, a highly satisfactory pigment may be produced by using the tallows which contain a certain proportion of this acid in conjunction with the saturated fatty acids.

It is considered probable that in the production of these pigments the fatty acid enters chemically into the constitution of a complex lead compound, and that the pigments may properly be regarded as double salts or compounds wherein part or all of the oxygen or the hydroxyl of the original pigment is replaced by a fatty acid. It is not desired however to restrict the invention by reference to any theory as to the actual constitution of the pigments, as they may perhaps be regarded as mixtures of so intimate a character as to possess the novel and characteristic properties described.

It is not material as regards the process whether the saturated organic acids be employed in a free state or as an alkali salt or soap; it being essential merely that the acids be present in a reacting condition and capable of replacing the oxygen or hydroxyl of the basic lead pigment. It is preferred however to use the alkali salts of the organic acids, as in such case the product is obtained in better condition for washing and grinding.

This application is a divisional continuation of my prior application Ser. No. 535,998, filed January 3, 1910.

I claim:

1. The method of preparing a white pigment which consists in replacing a part at least of the hydroxyl constituent of white lead by a saturated organic acid.

2. The method of preparing a white pigment which consists in replacing a part at least of the hydroxyl constituent of white lead by a higher fatty acid.

3. The method of preparing a white pigment which consists in replacing a part at least of the hydroxyl constituent of white lead by stearic acid.

4. A white pigment containing a carbonate of lead and a lead salt of a higher fatty acid.

5. A white pigment containing carbonate and stearate of lead.

In testimony whereof, I affix my signature in presence of two witnesses.

ALEXANDER S. RAMAGE.

Witnesses:
C. P. TOWNSEND,
E. A. BYRNES.